(12) United States Patent
Marupaduga (10) Patent No.: US 11,516,815 B1
(45) Date of Patent: Nov. 29, 2022

(54) ANTENNA SPR AS A BASIS TO DYNAMICALLY CAP THE MCS INDEX ON 5G NR

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 170 days.

(21) Appl. No.: 16/990,592

(22) Filed: Aug. 11, 2020

(51) Int. Cl.
*H04W 72/04* (2009.01)
*H04L 1/00* (2006.01)

(52) U.S. Cl.
CPC ....... *H04W 72/0493* (2013.01); *H04L 1/0003* (2013.01); *H04L 1/0009* (2013.01); *H04W 72/0473* (2013.01)

(58) Field of Classification Search
CPC .......... H04W 72/0493; H04W 72/0473; H04L 1/0003; H04L 1/0009
See application file for complete search history.

(56) References Cited

U.S. PATENT DOCUMENTS

| | | | | |
|---|---|---|---|---|
| 2001/0046870 A1* | 11/2001 | Stilp | ................... | G01S 5/06 455/457 |
| 2002/0034384 A1* | 3/2002 | Mikhail | ................ | G03B 17/24 396/310 |
| 2002/0065107 A1* | 5/2002 | Harel | .................... | H04W 16/28 455/562.1 |
| 2002/0132623 A1* | 9/2002 | Kingdon | ............... | H04W 64/00 455/456.5 |
| 2003/0021240 A1* | 1/2003 | Moon | ................... | H04L 1/0068 370/320 |
| 2003/0114162 A1* | 6/2003 | Chheda | ................. | H04W 16/02 455/450 |
| 2004/0008643 A1* | 1/2004 | Guturu | | |
| 2005/0227703 A1* | 10/2005 | Cheng | .................. | H04W 64/00 455/456.1 |
| 2006/0038926 A1* | 2/2006 | Mayer | ..................... | H04N 5/46 348/731 |
| 2008/0032726 A1* | 2/2008 | Tajima | ................ | H04W 52/283 455/509 |
| 2013/0273943 A1* | 10/2013 | Liu | ....................... | H04W 4/023 455/456.3 |
| 2016/0057636 A1* | 2/2016 | Ibrahim | ........... | H04W 52/0235 370/328 |
| 2016/0183275 A1* | 6/2016 | Inoue | .................... | H04W 72/12 455/450 |
| 2016/0337792 A1* | 11/2016 | Bhavsar | ................ | H04W 48/18 |
| 2019/0386807 A1* | 12/2019 | Kazmi | .................. | H04L 5/0094 |

* cited by examiner

*Primary Examiner* — Dinh Nguyen (57) ABSTRACT

Methods and systems are provided for dynamically capping an MCS index. A determination that one or more user devices are serviced by a sector of a cell site that has a Sector Power Ratio (SPR) above a threshold is made. Based on the SPR being above the threshold, the MCS index of the one or more user devices is capped. In response to the capped MCS index, a first Quadrature Amplitude Modulation (QAM) value is assigned to at least one of the one or more user devices based on a triangulation area corresponding to a location of the at least one of the one or more user devices.

18 Claims, 8 Drawing Sheets

ANTENNA SPR AS A BASIS TO DYNAMICALLY CAP THE MCS INDEX ON 5G NR

SUMMARY

The present disclosure is directed, in part, to dynamically capping a Modulation and Coding Scheme (MCS) index value based on an antenna sector power ratio (SPR), substantially as shown in and/or described in connection with at least one of the figures, and as set forth more completely in the claims.

In brief and at a high level, this disclosure describes, among other things, methods and systems for determining that a device is serviced by a sector of a cell site that has SPR above a threshold. An MCS index value of the device is dynamically capped based on the SPR being above the threshold. A Quadrature Amplitude Modulation (QAM) value is assigned to the device based on a location of the device or a triangulation area corresponding to the location of the device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present technology is described in detail below with reference to the attached drawing figures, wherein.

DETAILED DESCRIPTION

The subject matter of embodiments of the present disclosure is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
CQI Channel Quality Indicator
eNodeB Evolved Node B
gNodeB Next Generation Node B
GSM Global System for Mobile communications
DVD Digital Versatile Discs
EEPROM Electrically Erasable Programmable Read Only Memory
HSDPA High Speed Downlink Packet Access
LTE Long Term Evolution
MCS Modulation and Coding Schemes
MIMO Multiple Input Multiple Output
mMIMO Massive Multiple Input Multiple Output
MSK Minimum-Shift-Keying
MU-MIMO Multiple User Multiple Input Multiple Output
PC Personal Computer
PDA Personal Digital Assistant
PDSCH Physical Downlink Shared Channel
PSK Phase-Shift-Keying
PUSCH Physical Uplink Shared Channel
QAM Quadrature Amplitude Modulation
Qm Quadrature modulation
QPSK Quadrature Phase Shift Keying
RAM Random Access Memory
RF Radio-Frequency
RLFs Radio Link Failures
ROM Read Only Memory
SINR Transmission-to-Interference-Plus-Noise Ratio
SMS Short Message Service
SPR Sector Power Ratio
UE User Equipment
UMTS Universal Mobile Telecommunications Systems
WCDMA Wideband Code Division Multiple Access
WiMAX Worldwide Interoperability for Microwave Access Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless telecommunication networks provide access for a user device (e.g., a UE) to access one or more network services. In some cases, the desired network service may be a telecommunication service. In conventional systems, SPR is not considered a factor for making any modifications of a system or method corresponding to an MCS index. Further, these conventional systems do not consider SPR as a critical factor. For example, some conventional systems involve selection of a beam that uses a particular MCS value or selection of a beam with an MCS value based on received signal strength indication or signal-to-noise ratio. Accordingly, in conventional systems, SPR is not considered as one factor, as a critical factor, or as an exclusive factor. Some problems resulting from not considering SPR in these ways include lower UE performance and dropped connections between cell sites and UEs.

Unlike conventional systems that select beams with certain MCS values based on signal strength characteristics, the present disclosure dynamically caps an MCS index value based on the SPR being above a threshold. In doing so, the present disclosure maintains high performance for all UEs and maintains connections that conventional methods drop. Additionally, the present disclosure reduces interference that UEs would otherwise experience and thus improves efficiency at least by allowing for more resources when transmitting data to a particular range of space. By capping MCS index values as disclosed allows for the realization of these benefits to the relevant technologies.

For example, in one aspect, one or more non-transitory computer-readable media disclosed herein can have computer-executable instructions embodied thereon that, when executed, perform a method for dynamically capping a MCS index value. The method includes determining that a user device is serviced by a sector of a cell site that has a SPR above a threshold. Based on the SPR being above the threshold, the MCS index value of the user device is dynamically capped. A location of the user device based on at least one cell site factor is determined. In response to the capping, the MCS index value is assigned to the user device based on the location of the user device.

Yet another aspect of the present disclosure is directed to a method for dynamically capping the MCS index value of the device. The method determines that a device is serviced by a sector of a cell site that has a SPR above a threshold. Based on the SPR being above the threshold and without considering other channel conditions, the MCS index value of the device is dynamically capped. In response to the capping, assigning a QAM value to the device based on a determined location of the device.

In yet another aspect, a system for dynamically capping an MCS index value is provided. The system determines that one or more user devices are serviced by a sector of a cell site that has a SPR above a threshold. Based on the SPR being above the threshold, the MCS index value of the one or more user devices is dynamically capped. In response to the capping of the MCS index value, a first QAM value is assigned to at least one of the one or more user devices based on a triangulation area corresponding to a location of the at least one of the one or more user devices.

Figure 1:
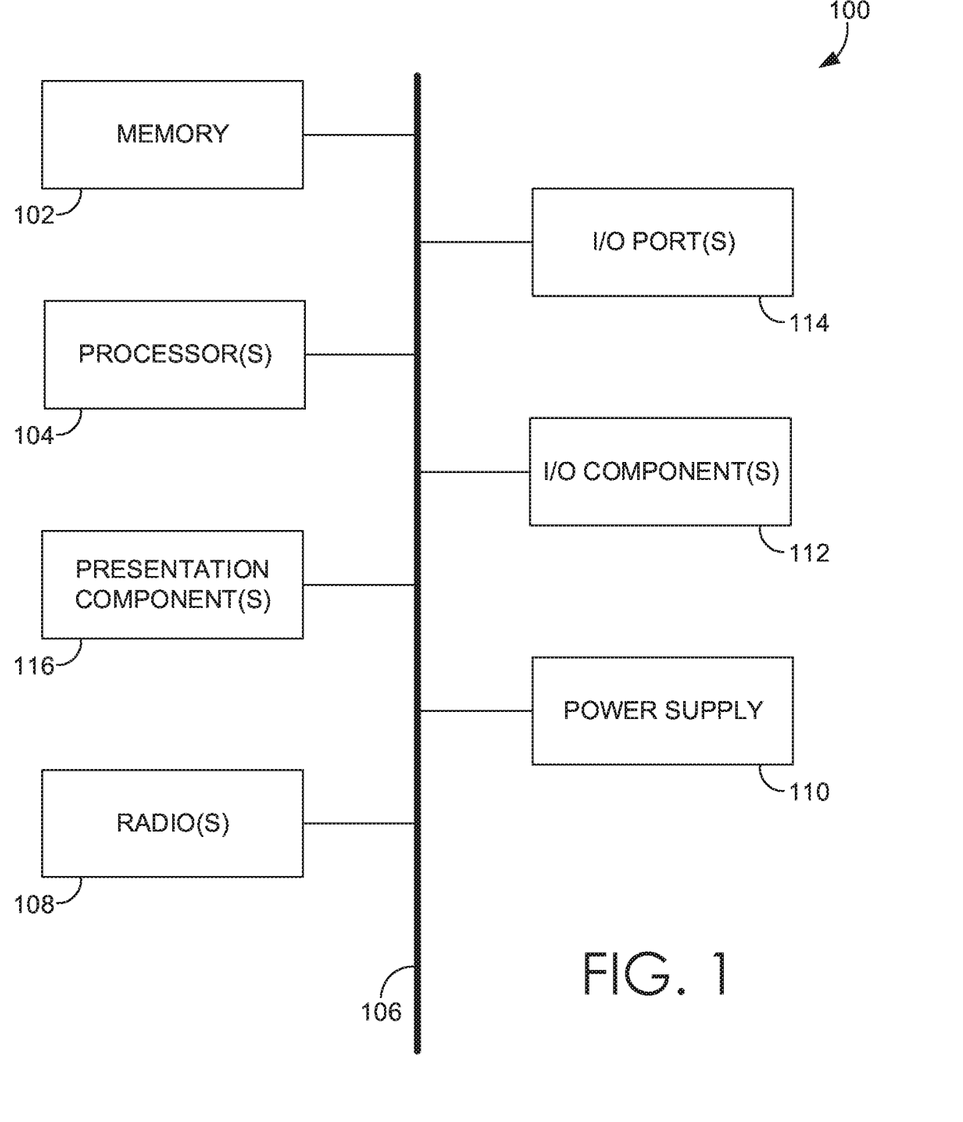
FIG. 1 depicts a diagram of an exemplary computing environment suitable for use in implementations of the present disclosure.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 106 that directly or indirectly couples the following devices: memory 102, processor(s) 104, radio(s) 108, power supply 110, input/output (I/O) component(s) 112, I/O port(s) 114, and presentation component(s) 116. Bus 106 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O component(s) 112. Also, processors, such as the processor(s) 104, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Additionally, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 102 includes computer-storage media in the form of volatile and/or nonvolatile memory. Memory 102 may be removable, nonremovable, or a combination thereof. Exemplary memory includes solid-state memory, hard drives, optical-disc drives, etc. Computing device 100 includes processor(s) 104 that read data from various entities such as bus 106, memory 102 or I/O component(s) 112. Presentation component(s) 116 presents data indications to a person or other device. Exemplary presentation component(s) 116 include a display device, speaker, printing component, vibrating component, etc. I/O port(s) 114 allow computing device 100 to be logically coupled to other devices including I/O component(s) 112, some of which may be built in computing device 100. Illustrative I/O component(s) 112 include a microphone, joystick, game pad, satellite dish, scanner, printer, wireless device, etc.

Radio(s) 108 represents a radio that facilitates communication with a wireless telecommunications network. In aspects, the radio(s) 108 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio(s) 108 might additionally or alternatively facilitate other types of wireless communications including Wi-Fi, WiMAX, LTE, or other VoIP communications. As can be appreciated, in various embodiments, radio(s) 108 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
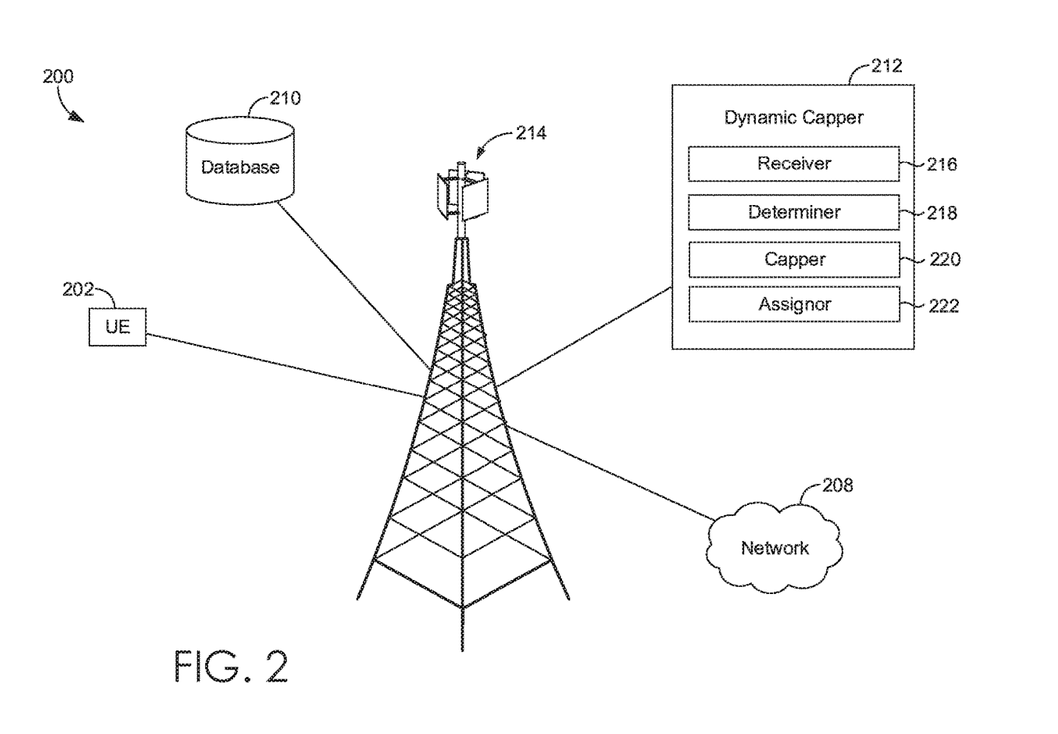
FIG. 2 illustrates a diagram of an exemplary network environment in which implementations of the present disclosure may be employed.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UE 202 (network environment 200 may contain more UEs), network 208, database 210, dynamic capper 212, and cell site 214. In the network environment 200, UE 202 may take on a variety of forms, such as a PC, a user device, a smart phone, a smart watch, a laptop computer, a mobile phone, a mobile device, a tablet computer, a wearable computer, a PDA, a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with network 208, which may be a public or a private network.

In some aspects, the UE 202 corresponds to a user device or a computing device. For example, the user device may include a display(s), a power source(s) (e.g., a battery), a data store(s), a speaker(s), memory, a buffer(s), a radio(s) and the like. In some implementations, the UE 202 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the UE 202 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1x circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the UE 202 that is located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the UE 202 when the UE 202 is geographically situated outside of the cell associated with cell site 214.

In an exemplary aspect, the cell site 214 comprises a base station that serves at least one sector of the cell associated with the cell site 214, and at least one transmit antenna for propagating a signal from the base station to one or more of the UE 202. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

As shown, cell site 214 is in communication with the dynamic capper 212, which comprises a receiver 216, a determiner 218, a capper 220, and an assignor 222. Beginning with receiver 216, the receiver 216 may retrieve data from the UE 202, the network 208, the database 210, and the cell site 214. In some embodiments, the receiver 216 may receive various information from UEs and from particular frequency bands. For example, receiver 216 may receive MCS index data from various frequency bands corresponding to the antenna elements, the MCS data comprising QPSK values, QAM values, code rates, RF conditions, and CQI. To illustrate, the receiver may receive information that a first base station is using a plurality of MCS index values.

In some embodiments, MCS index values are related to Modulation Order (Modulation Depth, e.g. QPSK, 16 QAM, 64 QAM, 256 QAM). A modulation order is illustrated by the following: 2 Qm for QPSK, 4 Qm for 16 QAM, 6 Qm for 64 QAM and 8 Qm for 256 QAM transmissions. Qm refers to any modulation scheme that uses two carrier waves out of phase by 90 degrees that are modulated by separate information signals. Qm formats may include, for example, QAM, PSK, or MSK. Qm may be defined differently depending on PDSCH and PUSCH. With respect to PUSCH, Qm 6 varies depending on UE capability. Qm 6 in an upper link case would be interpreted 16 QAM if the corresponding UE did not support 64 QAM. Although Qm varies depending on PUSCH, PDSCH, and UE capability, mapping between MCS index value and Transport Block Size index value does not change.

Further, data the receiver 216 may access includes, but is not limited to, location information of the UE 202 and channel quality information. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. Channel quality information may indicate the quality of communications between one or more user devices and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed SINR and/or signal strength at the user device(s), or throughput of the connection between the cell site and the user device(s). Location and channel quality information may take into account the UEs' capability, such as the number of antennas of the user device and the type of receiver used by the user device for detection. The receiver 216 may also be configured to receive information from cell sites other than cell site 214 or other processors and/or servers.

The receiver 216 may also access SPR data. An SPR is a measure of an antenna's ability to minimize interference. SPR describes a RF power that is radiated outside of an antenna array's sector relative to a RF power that is radiated and retained within the antenna array's sector. Because SPR is a ratio, SPR may be represented using a percentage value or numerical value. An example of a low SPR value is 3-4% and an example of a high SPR value is 8-10%. Antennas with greater spillover areas have greater SPR values. SPR information may be used for dynamically combatting interference and noise at cell site 214. Additionally, the SPR values of cell site antennas may be used for selection and assignment of specific frequency bands to component carriers of UEs in a telecommunications environment.

Increased or high SPR values have negative impacts, which are exacerbated in LTE environments that allow and facilitate multiple frequency bands and carrier aggregation for combining multiple frequency bands for uplink and/or downlink communications. Negative impacts that high-powered, undesired RF radiation at a cell site causes may be reduced or mitigated by assigning a frequency band of low-SPR antennas to a primary component carrier of a UE. For example, a frequency band that corresponds to a low-SPR antenna may be assigned to the primary component carrier of an inter-carrier aggregation capable device that is geographically located at or near radio frequency "spillover" areas (i.e., radiation outside of an antenna's desired sector at a cell site) and which is experiencing lower throughput.

Additionally, SPR quantifies the power of RF radiation that is outside of the sector of an antenna relative to the power of the RF radiation radiated within the same sector of the same antenna. As such, the SPR represents the power of the undesired RF signal relative to the power of the desired RF signal, for a particular antenna. Accordingly, SPR is a measure of power and undesired RF radiation refers to an amount of power of the undesired RF radiation. Thus, as undesired RF spillover of an antenna increases, the SPR of the same antenna increases and vice versa, when all other factors are controlled. As undesired RF spillover and SPR increase, interference and noise increase at the cell site 214. Due to these measures, SPR may be used as a predictor, indictor, and/or measure of an antenna's likelihood of causing interference and noise, or actual causation of interference and noise.

SPR may be affected by orientation (i.e., how the service coverage area has been partitioned into sectors), electrical tilt, mechanical tilt, carrier band associated with an antenna, technical operating specifications of an antenna, manufacturing and materials of an antenna, environmental conditions (i.e., weather, heat, wear and tear), and power supplied to an antenna, for example. Carrier bands may refer to spectrums in any of the low band (e.g., Band 71/600 MHz, 700 MHz), the mid band (e.g., PCS, AWS1/2/3/4), and the high band (e.g., WCS/2.3 GHz, EBS/BRS 2.5 GHz, 24 GHz, 29 GHz, 29 GHz, and 39 GHz spectrums, and 5G mobile network bands). Further, SPR for an antenna may be calculated using RF radiation patterns. For example, the SPR of the antenna accounts for the power of its undesired RF signal relative to the power of the desired RF signal. The SPR of the antenna quantifies the amount of power of the undesired RF radiation contributed by the antenna to areas relative to the amount of power of the desired RF radiation in a sector of the antenna. Due to spillover among various antennas, certain areas experience the presence of interference and noise.

Because SPR values may be affected by orientation (i.e., how the service coverage area has been partitioned into sectors), electric tilt, mechanical tilt, specific frequencies of a carrier band associated with an antenna, technical operating specifications of an antenna, manufacturing and materials of an antenna, environmental conditions, and power supplied to an antenna, the receiver 216 may receive a particular SPR value of an antenna at the cell site 214 when UE 202 enters a service coverage area of the cell site 214. Alternatively, receiver 216 may receive SPR values of the antennas at the cell site 214 periodically, which may be stored in the database 210 at the base station controlling the cell site 214. Stored SPR values may be referenced when a UE enters a service coverage area of the cell site 214. Additionally or alternatively, SPR values of the antennas at the cell site 214 may be received for individual antennas at various times and periodically updated so that the performance of each antenna can be monitored, for example.

Turning to 218, the determiner 218 may determine that UE 202 is serviced by a sector of a cell site that has a SPR above a threshold. The threshold may be determined by analyzing a power supplied to a transmitting-receiving component of the cell site or by analyzing a network signal type emitted by the transmitting-receiving component. In some embodiments, the threshold may be determined by analyzing a network footprint via a measured performance of active state UEs in a coverage area. The network footprint may depend on a positioning of a particular transmitting-receiving component and the threshold may indicate low UE performance at a location within a range that is near the cell site 214. Additionally, the threshold may indicate an undesirable interference or noise level resulting from high-powered RF radiation and an undesirable amount of cell site 214 resources being used to receiving RF transmissions. Other factors contributing to the threshold determination may include the following: spillover at a particular area, RF radiation patterns, sector partitioning, electrical tilt, mechanical tilt, carrier band associated with an antenna, etc.

Turning to 220, the capper 220 may cap an MCS index value of the UE 202. Further, the capper 220 may adjust the cap of the MCS index value when the SPR changes and when the changed SPR is still above the threshold. This adjustment may occur to further improve interference and noise levels with respect to the initial capping. As one example of capping, in one of several PDSCH cases, MCS index value 0 may correspond to Qm 2, MCS index value 1 may correspond to Qm 2, MCS index value 10 may correspond to Qm 4, MCS index value 17 may correspond to Qm 6, and MCS index value 25 may correspond to Qm 6. Continuing the example, depending on UE 202 support capabilities and UE 202 configuration by higher layers to transmit only QPSK and 16 QAM, the MCS index value may be capped at 17.

Turning to 222, the assignor 222 may assign a first QAM value to UE 202 based on the following: a triangulation area corresponding to a location of the UE 202, a location of the UE 202, or based on a location factor of the UE 202 (e.g. a latitude of the UE 202). Further, in addition to assigning a particular QAM value, the assignor 222 may assign a Qm, a QPSK, or a Millimeter Wave. As one example of assigning, if the MCS index value is capped at 28 and the UE 202 is capable of supporting 64 QAM in a PUSCH case and the UE 202 has not been configured by higher layers to transmit only QPSK and 16 QAM, the assignor 222 may assign the UE 202 to 64 QAM if the corresponding MCS index value is above 21 and below 28.

Figure 3:
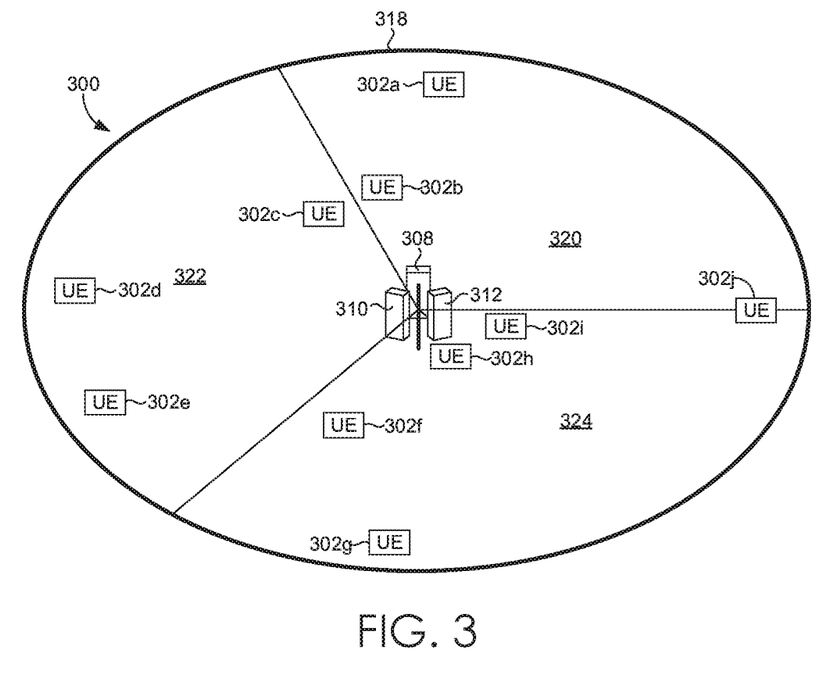
FIG. 3 illustrates an exemplary schematic of a cell site in which implementations of the present disclosure may be employed.

Turning now to FIG. 3, an exemplary schematic 300 of the cell site 214 is depicted in accordance with implementations of the present disclosure. In FIG. 3, the cell site 214 has a service coverage area 318 that is determined by a first antenna 308, a second antenna 310, and a third antenna 312. The first antenna 308, second antenna 310, and third antenna 312 are co-located at the cell site 214. UEs within the service coverage area 318, also known as a "range" of the cell site 214, may be provided with telecommunications services (e.g., voice, data, messaging, internet, application, and/or location services) and connection to the network 208. Each of the first antenna 308, second antenna 310, and third antenna 312 has an RF radiation pattern that may be described as a sector of the cell site 214. Accordingly, the service coverage area 318 may be represented as sectors, wherein there is one sector for each of first antenna 308, second antenna 310, and third antenna 312, for example.

The service coverage area 318 may be described using 360 degrees, which is comprised of a first sector 320, a second sector 322, and a third sector 324, for example, where each sector comprises a portion of 360 degrees. The first sector 320 may correspond to the first antenna 308. The second sector 322 may correspond to the second antenna 310. The third sector 324 may correspond to the third antenna 312. Although the first sector 320, second sector 322, and third sector 324 appear the same or similar in size and shape, the exemplary schematic of FIG. 3 is a simplification. Each of the three sectors may be different sizes and shapes, and each of the three sectors may comprise unequal portions of the whole service coverage area 318. In an embodiment, one or more of the three sectors may be the same size and the same shape, relative to one another and/or the whole service coverage area 318. In another embodiment, one or more of the three sectors may be similar in relative size, but different in shape, relative to one another and/or the whole service coverage area 318. In yet another embodiment, one or more of the three sectors share the same or similar shape, but are different in size, relative to one another and/or the whole service coverage area 318.

For example, one of the three sectors may comprise half or more than half of the whole service coverage area 318. In another example, one of the three sectors may comprise less than or equal to ¼ of the whole service coverage area 318. In yet another example, one of the three sectors may comprise similar portions (e.g., all sectors being equal to or about 33% or 120 degrees) of the whole service coverage area 318, plus or minus an allowance relative to the other portions and/or the whole service coverage area 318 (e.g., plus or minus 3% relative to one another, or plus or minus 10 degrees). In one example, the three sectors comprise portions of the whole service coverage area 318 represented by ratios, such as the first sector 320 comprising ⅓ of the whole service coverage area 318, the second sector 322 comprising ¼ of the whole service coverage area 318, and the third sector 324 comprising the remaining portion of the whole service coverage area 318.

Each sector corresponds to a radiation pattern of a corresponding antenna. The shape, size, and dimension(s) of the service coverage area 318 may be determined by a specific radiation pattern of the corresponding antenna, as well as a direction, electrical tilt, mechanical tilt, installation height above the ground or surrounding geographic area, technical operating specifications, materials, obstructions (i.e., buildings, mountains, or other elevations), and power supplied to each of the three antennas depicted at 300. The three antennas may wirelessly receive and transmit RF transmissions to and from UEs other antennas, other cell sites, base stations, and/or satellites, to facilitate communications between such devices, though not shown in FIG. 3 for clarity. In an embodiment, the three antennas may capture two-way communications between the network 208 and UEs within a geographic area corresponding to the service coverage area 318.

UEs 302a-302j each have a location that may be determined by various location information. For example, UEs 302a, 302d, 302e, and 302g are located further away from their respective antennas than UEs 302i and 302h. UE 302j is straddling first sector 320 and third sector 324. UE 302g is near the perimeter of service coverage area 318. Location information of the UEs 302a-302j may be determined via GPS location information, which may be obtained from an inter-carrier aggregation capable device that determines location information relative to the sectors and corresponding antennas. A base station may use the GPS location information of the inter-carrier aggregation capable device and location information for the cell site when locating the inter-carrier aggregation capable device. Using the GPS location information of the inter-carrier aggregation capable device, the base station may recognize that the inter-carrier aggregation capable device is located in a particular sector and is located within the predefined distance of the cell site 214.

Further, a location of one of the UEs 302a-302j may be determined based on signal strengths of one or all of the signals received by the UE, wherein the one or all of the signals were transmitted by at least one of the first antenna 308, second antenna 310, and third antenna 312. In some embodiments, the location of the at least one of the UEs is determined based on a round-trip signal time of at least one signal transmitted by at least one of the first antenna 308, second antenna 310, and third antenna 312. In an embodiment, UE 302j is serviceable by the first sector 320 and the second sector 324. In some embodiments, a UE may be serviceable by more than two sectors.

In some embodiments, a predetermined distance from an antenna may be used for assignments of QAM values. For example, the predetermined distance is identified using an identifier of the cell site 214. Additionally or alternatively, the predefined distance may be recognized using an identifier that is specific to one or more of the three antennas. The predefined distance may also be determined via a selection of a distance that is appropriate for a large-scale component, a small-scale component, a geographic "footprint" of the service coverage area 318, and/or a set volume of UEs within the service coverage area 318 (e.g., urban location or rural location). Additionally, the predefined distance may be provided to the base station by the cell site 214, wherein the cell site 214 comprises or communicates with a memory.

Figure 4:
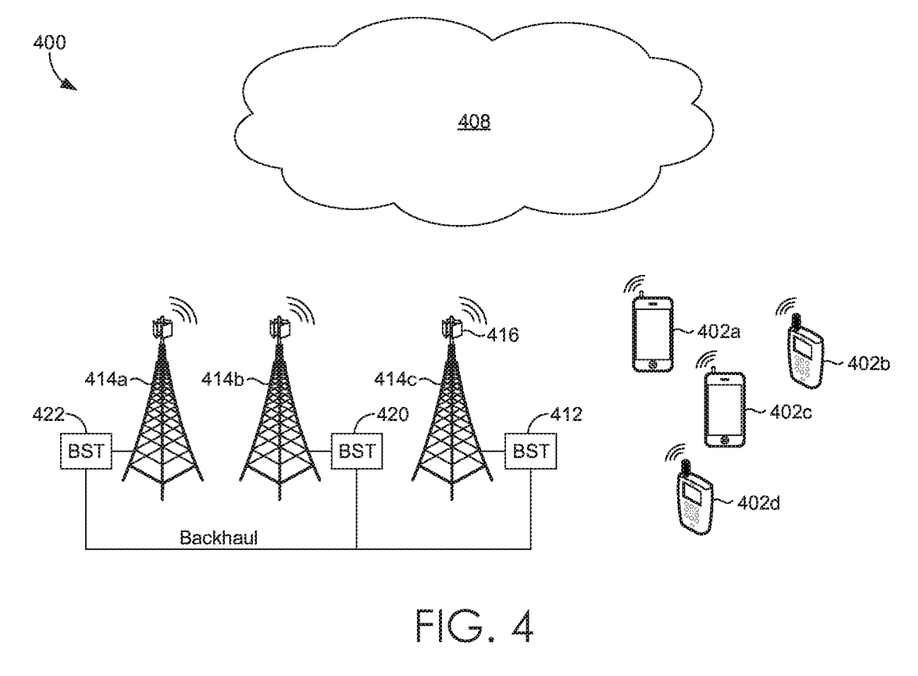
FIG. 4 illustrates an exemplary network environment in which implementations of the present disclosure may be employed.

Turning now to FIG. 4, an example of a network environment 400 suitable for use in implementing embodiments of the present disclosure is provided. The network environment 400 is but one example of a suitable network environment and is not intended to suggest any limitation as to the scope of use or functionality of the disclosure. Neither should the network environment 400 be interpreted as having any dependency or requirement relating to any one or combination of components illustrated.

The network environment 400 includes a network 408 that provides service to one or more UEs 402a/402c, and one or more legacy UEs 402b/402d. The network 402 may be accessible through one or more base stations 412, 420, and 422 that are connected to a backhaul server. The base station 412 (e.g., whether local or remote) may manage or otherwise control the operations of components of cell site 414c, including an antenna array 416. Additionally, the base station 420 (e.g., whether local or remote) may manage or otherwise control the operations of components of cell site 414b and the base station 422 may manage cell site 414a. The one or more base stations 412, 420, and 422 may include one or more processors and computer-readable storage media having computer-executable instructions or computer instruction modules embodied thereon for execution by one or more processors.

The antenna array 416 may radiate in a particular direction and thus may correspond to a particular sector of a cell site. The antenna array 416 may have a plurality of antenna elements, in embodiments. In one embodiment, antenna array 416 is configured to have a plurality of elements that in number, arrangement, and/or density, are configured for mMIMO. In one such embodiment, the base station 412 may include a radio and/or a controller, such as a Massive Multiple-Input Multiple-Output Unit for controlling a mMIMO configured antenna array, such as the antenna array 416 having a plurality of antenna elements. The base station 412 may use the controller to monitor one or more of throughput, signal quality metrics (e.g., SINR), a quantity of unique users/subscribers, a quantity of unique UE(s), and/or RLFs that occur at the base station, all of which may be monitored dynamically and/or as stored in a data store.

The base station 412 may use a radio that is connected to the antenna array 416 by a physical RF path, where the radio is used to cause the antenna array 416 to transmit radio-frequency signals using the plurality of antenna elements. The plurality of antenna elements in the antenna array 416 may include portions of antenna elements (not shown). In embodiments, the plurality of antenna elements of the antenna array 416 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or alternatively "split" into equal halves, wherein each group or half operates to provide a coverage area for a distinct access technology when the antenna array 416 operates in a dual technology mode.

In some embodiments, the antenna array 416 is partitioned such that the first portion of antenna elements is associated with the first access technology and the second portion of antenna elements is associated with the second access technology. When the antenna array 416 is operating in a dual technology mode, each portion of the plurality of antenna elements may operate using only one distinct protocol and/or access technology relative to the other portions in the antenna array, in some embodiments. In one example, a first portion of antenna elements may operate using 5G wireless access technology and the second portion of antenna elements may operate using 4G wireless access technology. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 412 may provide the one or more UEs 402a/402c, and the one or more legacy UEs 402b/402d with access to the network 402, in embodiments. In some embodiments, the first portion of antenna elements may communicate with the one or more UEs 402a/402c using 5G technology and the second portion of the antenna elements may communicate with the one or more legacy UEs 402b/402d using 4G technology. When operating in the dual technology mode, the antenna array 416 may concurrently connect to and communicate with the one or more UEs 402a/402c and the one or more legacy UEs 402b/402d using, respectively, at least two distinct access technologies.

Accordingly, in one example, when the antenna array 416 is operating in the dual technology mode, the base station 412 concurrently acts an eNodeB (or "eNB") and gNodeB (or "gNB"). As such, the base station 412 may provide service to one or more access technologies to both current and legacy UE. In addition to communicating with t the one or more UEs 402a/402c, and the one or more legacy UEs 402b/402d, the base station 412 may also communicate with one or more neighboring base stations. In some embodiments, the base station 412 may communicate with neighboring base station 420 using the first access technology and may communicate with another neighboring base station 422 using the second access technology. For example, because the base station 412 may operate concurrently as an eNodeB and a gNodeB using the antenna array 416 that is partitioned and operating in a dual technology mode, the base station 412 may communicate with other base stations, for example, including legacy base stations that cannot use current access technologies (e.g., 5G) or current base stations that lack backward compatibility with prior access technologies (e.g., 4G). In embodiments, the base station 412 may bi-directionally exchange information with neighboring base stations 420 and 422 through an X2 interface or X2 link. Information regarding signal quality, RF conditions, one or more RLFs, and SINR levels at each of the neighboring base stations 420 and 422, and/or as reported from UE to the neighboring base stations 420 and 422 may be communicated to the base station 412 via the X2 link. Additionally or alternatively, information regarding signal quality, RLFs, and SINR levels at each of the neighboring base stations 420 and 422 may be communicated to the base station 412 over the backhaul.

As mentioned, the base station 412 may include a radio and/or a controller, such as an MMU, that enables the base station 412 to adjust or modify the operations and transmissions of the plurality of antenna elements in the antenna array 416. In embodiments, the operations, configurations, and/or settings of each antenna element may be individually controlled and adjusted by the base station 412 using the controller. In some embodiments, the operations, configurations, and/or settings of the first portion of antenna elements may be controlled and adjusted as a group by the base station 412 using a controller, such as an MMU, independent of the second portion of antenna elements. In a similar fashion, the operations, configurations, and/or settings of the second portion of antenna elements may be controlled and adjusted as a group by the base station 412 using the controller, independent of the first portion of antenna elements. Accordingly, the base station 412 may use a controller to independently adjust different groups or portions of antenna elements within one antenna array.

In embodiments, the operations, configurations, and/or settings of each individual antenna element may be adjusted and customized. For example, the base station 412 instructs a portion of antenna elements to transmit one or more synchronization signals using a periodicity. In another example, the portion of antenna elements may transmit a plurality of synchronization signals using the periodicity, as instructed by the base station 412. The synchronization signals may be specific to and/or configured for the first access technology, in embodiments.

Accordingly, the base station 412 may use a controller to independently adjust different individual antenna elements, any number of groupings and/or subset(s) of each portion of antenna elements, and/or portions of antenna elements within one antenna array. In embodiments, the base station 412 may use a controller to measure and monitor one or more of throughput, signal quality metrics (e.g., SINR), a quantity of unique users/subscribers, a quantity of unique UE, and/or RLFs.

Figure 5:
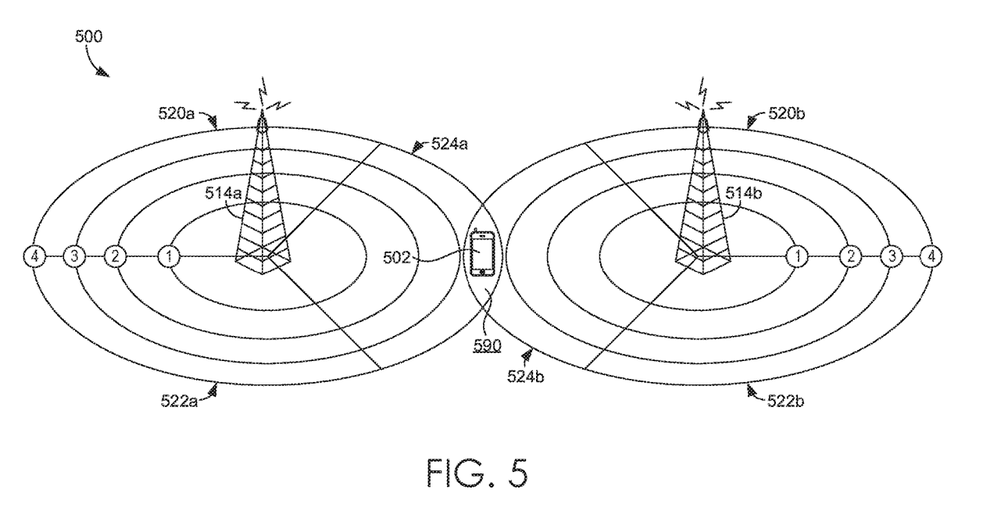
FIG. 5 depicts an exemplary environment with two cell sites having an overlapping sector, in accordance with implementations of the present disclosure.

Turning now to FIG. 5, exemplary environment 500 comprises a first cell site 514a and a second cell site 514b, wherein the two cell sites have an overlapping portion 590 of a sector. The first cell site 514a has a first sector 520a, a second sector 522a, and a third sector 524a. The second cell site 514b has a first sector 520b, a second sector 522b, and a third sector 524b. Each sector has several concentric bands (e.g. 1, 2, 3, and 4) with a different radius or distance from the respective cell site. Each sector may comprise a distance from one edge of the sector to a second edge of the sector. For example, the first cell site 514a may determine that a received signal from a UE is coming from sector 522a and that the origin of the signal from a UE is between concentric bands 3 and 4. In another example, a received signal from a UE may come from sector 520a between concentric bands 2 and 3. The signal from the UE may comprise an outgoing call within an approximate distance from either edge of the concentric bands 2 and 3 of the sector 520a.

In another example, if UE 502 is communicating with the second cell site 514b at the same time it is communicating with the first cell site 514a, the ability to locate UE 502 at the overlapping portion 590 improves from the situation locating the UE in the first sector 520a and the second sector 522a. UE 502 is located in the overlapping portion 590 located between concentric bands 3 and 4 of the third sectors 524a and 524b. Accordingly, UE 502 is located in the overlapping portion 590 of the third sectors 524a and 524b, wherein an accurate location of the UE 502 may be estimated.

For example, the accurate location may be determined using a distance root mean squared that comprises a single number expressing 2D accuracy. The distance root mean squared may be computed for a horizontal position of UE 502. Standard errors from a known position of directions of a coordinate axis may be used for calculating the distance root mean squared. Standard errors of estimate coordinates (x, y) of each position point may be predicted from corresponding variances on a diagonal of a covariance matrix. Further, an uncertainty region (e.g. a property of space extending in one or more directions such that a likelihood exists that a UE is located within the uncertainty region) may be identified for determining the accurate location. In embodiments, identifying the uncertainty region includes identifying a dilution of the precision factor or a served distance between a radio of the UE and a radio of a base station. In this regard, these location system parameters, either alone or in combination, may be identified as the uncertain parameter.

Locating a UE may also involve triangulation including parameters such as proximity between the first cell site 514a and the second cell site 514b. For example, densely populated urban areas may have cell sites that are close together, which would allow for a more accurate estimation of a UE's location than in a rural area having cell sites that are further apart. The proximity between the first cell site 514a and the second cell site 514b may comprise a distance measurement from a wireless access node of the cell sites to the UE. The wireless access node may measure or determine a distance to the UE distance via a measured signal strength of a received signal that was exchanged between the wireless access node and the UE. The signal strength measurement may be performed by the wireless access node and/or the UE. The UE distance may be obtained by the wireless access node requesting location information (e.g. GPS information) from the UE or by determining the distance to the UE using information obtained from other, neighboring wireless access nodes.

Figure 6:
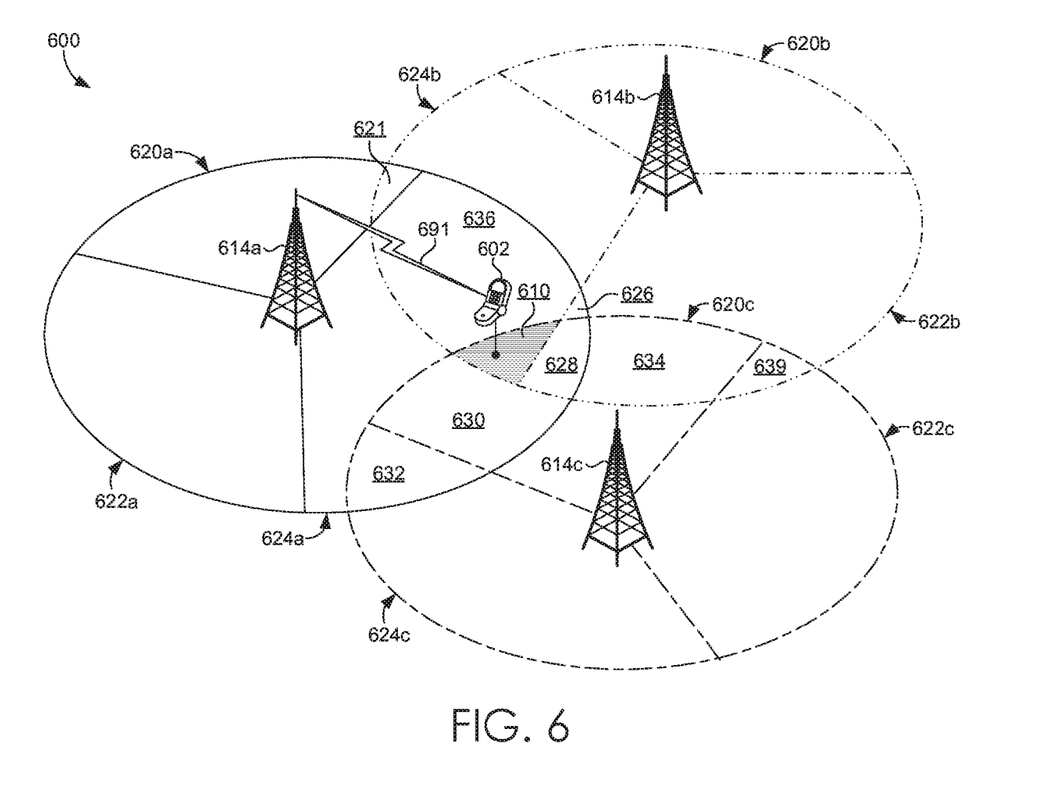
FIG. 6 depicts an exemplary environment with three cell sites having an overlapping sector, in accordance with implementations of the present disclosure.

Turning now to FIG. 6, exemplary environment 600 comprises a first cell site 614a a second cell site 614b, and a third cell site 614c. The first cell site 614a has three sectors: 620a, 622a, and 624a. The second cell site 614b has three sectors: 620b, 622b, and 624b. The third cell site 614c has three sectors: 620c, 622c, and 624c. Sector 620a and sector 624b have an overlapping portion 621. Sector 624a and sector 624b have an overlapping portion 636. Sector 624a and sector 622b have an overlapping portion 626. Sector 624a and sector 624c have an overlapping portion 632. Sector 624a and sector 620c have an overlapping portion 630. Sector 622b and sector 620c have an overlapping portion 634. Sector 622b and sector 622c have an overlapping portion 639. Sector 624a, sector 622b, and sector 620c have an overlapping portion 628. Sector 624a, sector 624b, and sector 620c have an overlapping portion 610 that comprises UE 602, and wherein the first cell site 614a has a signal 691 transmitting to or from the UE 602.

Cell site triangulation may be used for determining the location of a UE. An antenna of a cell site may be arranged with three antenna arrays, with each antenna array covering up to a 120° sector having the cell site at the center. In operation, cell site triangulation methods require information pertaining to the actual locations of each cell site. Within each sector, a cell site may make measurements of how far away a UE is transmitting a signal. The cell site may measure the signal strength and the round-trip signal time and uses the measurements to determine the location of the mobile device. The location of the UE can be obtained as a wireless access node of an antenna uses information obtained from other, neighboring wireless access nodes.

For example, determination of the location of UE 602 may comprise a combination of measurements from cell sites 614a, 614b, and 614c. For example, a triangulation area may be determined, wherein the triangulation area includes the overlapping portion 610 of sector 624a, sector 624b, and sector 620c. The triangulation area may be determined by a wireless access node of an antenna corresponding to a sector, wherein measurements for determining the triangulation area may include a UE distance, a UE direction angle, a UE elevation angle, frequency availability of a frequency band, and user access information.

The UE distance may comprise a distance measurement from the wireless access node to the UE 602. The wireless access node may measure or determine a distance to UE 602 by measuring a signal strength of a received signal that is exchanged between the wireless access node and the UE 602. Additionally, the UE direction angle may comprise a direction angle to the UE 602 with respect to a reference axis, such as to a reference compass axis, for example. The wireless access node may determine or measure the UE direction angle. The UE direction angle may be obtained by the wireless access node requesting location information from the UE 602. The UE direction angle may be obtained through the wireless access node determining the direction angle to the UE 602 using triangulation and using information obtained from other, neighboring wireless access nodes. The UE direction angle may be obtained through the wireless access node obtaining GPS information for the UE 602 and using the GPS information to determine the direction angle to the UE 602. The UE distance and UE direction angle may be measured by each of the three sectors: sector 624a, sector 624b, and sector 620c.

The UE elevation angle may comprise an elevation angle to the UE 602. The wireless access node may determine or measure the UE elevation angle to the UE 602. The UE elevation angle may be positive when the UE 602 is at a higher elevation than the wireless access node. The elevation angle may be negative when the UE 602 is at a lower elevation than the wireless access node. Further, the UE elevation angle may comprise a reliable indication that the UE 602 is located within a building. For example, a positive UE elevation angle is indicative of the UE being located above a ground floor, and is therefore a good indication that the UE 602 is in the building. This may be true even without determining the UE distance and the UE direction angle. The UE elevation angle may be measured by each of the three sectors: sector 624*a*, sector 624*b*, and sector 620*c*.

The frequency availability of the frequency band may comprise information about whether building-penetrating frequencies are available. The frequency availability of the frequency band may additionally comprise information about whether non-penetrating frequencies are available. The frequency availability of the frequency band therefore comprises information about which frequencies can be used for a particular communication mode. The frequency availability of the frequency band may be used to determine whether the wireless access node should allocate a building-penetrating frequency or allocate a non-penetrating frequency. For example, if there are no non-penetrating frequencies available, then the wireless access node will have to allocate a building-penetrating frequency to the UE 602. Conversely, if there are no building-penetrating frequencies available, then the wireless access node will have to allocate a non-penetrating frequency to the UE 602. Lastly, the user access information may comprise information about a particular traffic channel, a level of user service subscription, user permissions, and UE capabilities. The frequency availability of the frequency band and user access information may be measured by each of the three sectors: sector 624*a*, sector 624*b*, and sector 620*c*.

Figure 7:
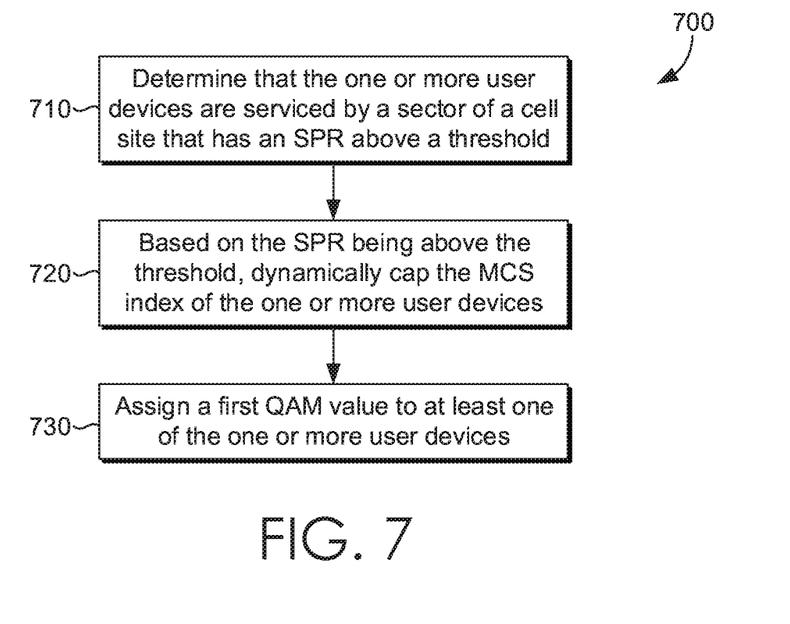
FIG. 7 depicts an exemplary flow diagram for dynamically capping a Modulation and Coding Scheme (MCS) index value.

Turning now to FIG. 7, exemplary flow diagram 700 comprises a method for dynamically capping an MCS index value. At 710, it is determined that one or more user devices are serviced by a sector of a cell site that has an SPR above a threshold. The threshold may be determined by analyzing a power supplied to a transmitting-receiving component of the cell site and a type of network signal emitted by the transmitting-receiving component. At 720, based on the SPR being above the threshold, the MCS index value of the one or more user devices is dynamically capped. The triangulation area may be determined using an overlapping sector comprising three sectors, each of the three sectors corresponding to one of three antenna arrays. The location of the at least one of the one or more user devices may be determined based on signal strengths of at least one signal from each of the three antenna arrays that the at least one of the one or more user devices received. Additionally, the location of the at least one of the one or more user devices may be determined based on a round-trip signal time of at least one signal from each of the three antenna arrays to the at least one of the one or more user devices. At 730, in response to the capping of the MCS index value, a first QAM value is assigned to at least one of the one or more user devices based on a triangulation area corresponding to a location of the at least one of the one or more user devices. Additionally, a second QAM value may be assigned to at least one of the one or more user devices, wherein the second QAM value is greater than the first QAM value. In another example, the cap may be adjusted when the SPR changes and when the changed SPR is still above the threshold. Thereafter, the first QAM value may be reassigned based at least in part on the changed SPR.

Figure 8:
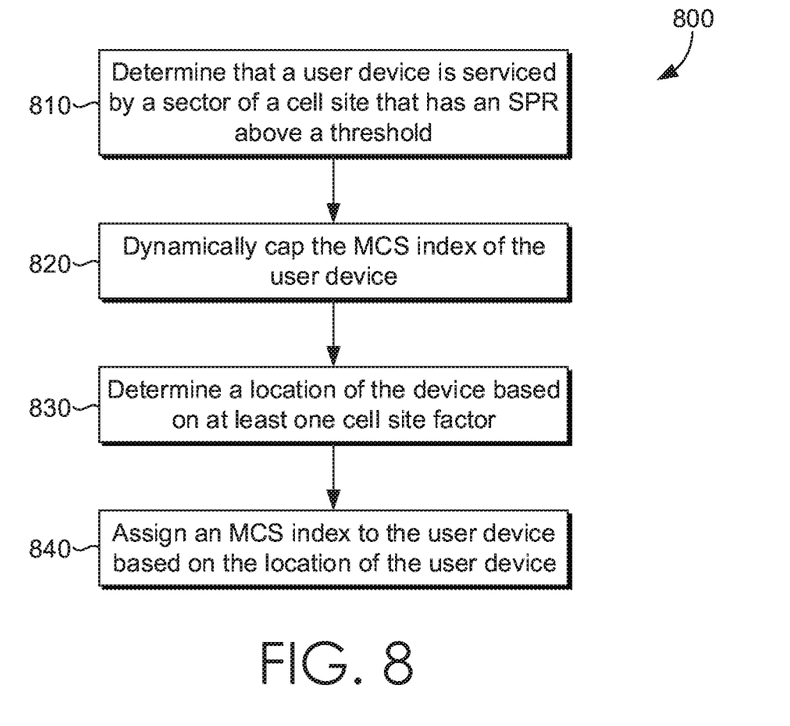
FIG. 8 depicts another exemplary flow diagram for dynamically capping an MCS index value.

Turning now to FIG. 8, exemplary flow diagram 800 comprises a method for dynamically capping an MCS index value. At 810, it is determined that a user device is serviced by a sector of a cell site that has an SPR above a threshold. At 820, based on the SPR being above the threshold, the MCS index value of the user device is dynamically capped. At 830, a location of the user device based on at least one cell site factor is determined. The at least one cell site factor comprises (1) a first distance between the cell site and a second cell site within a predetermined range of the user device, (2) a second distance between the cell site and the user device, and (3) a third distance between the second cell site and the user device. The first distance between the cell site and the second cell site comprises a distance between a first antenna element of the cell site and a second antenna element of the second cell site. The second distance between the cell site and the user device may be determined using a measured signal strength of a signal received by the user device from the cell site. Additionally, the first distance, the second distance, and the third distance may be determined using a precision factor and an accuracy factor, the precision factor and the accuracy factor accounting for error from positions and directions of the cell site, the second cell site, and the user device. Further, the second distance between the cell site and the user device may be determined using a measured signal strength of a signal received by the cell site from the user device. The at least one cell site factor may also comprise a distance from the cell site to the user device and a direction angle from an antenna element of the cell site to the user device. The direction angle may be determined using a wireless access node of the cell site and GPS information of the user device. Further, the at least one cell site factor may comprise an elevation angle of the user device corresponding to the cell site. At 840, in response to the capping, the MCS index value is assigned to the user device based on the location of the user device, wherein the MCS index value comprises a QAM level, a QPSK, or a Millimeter Wave.

Figure 9:
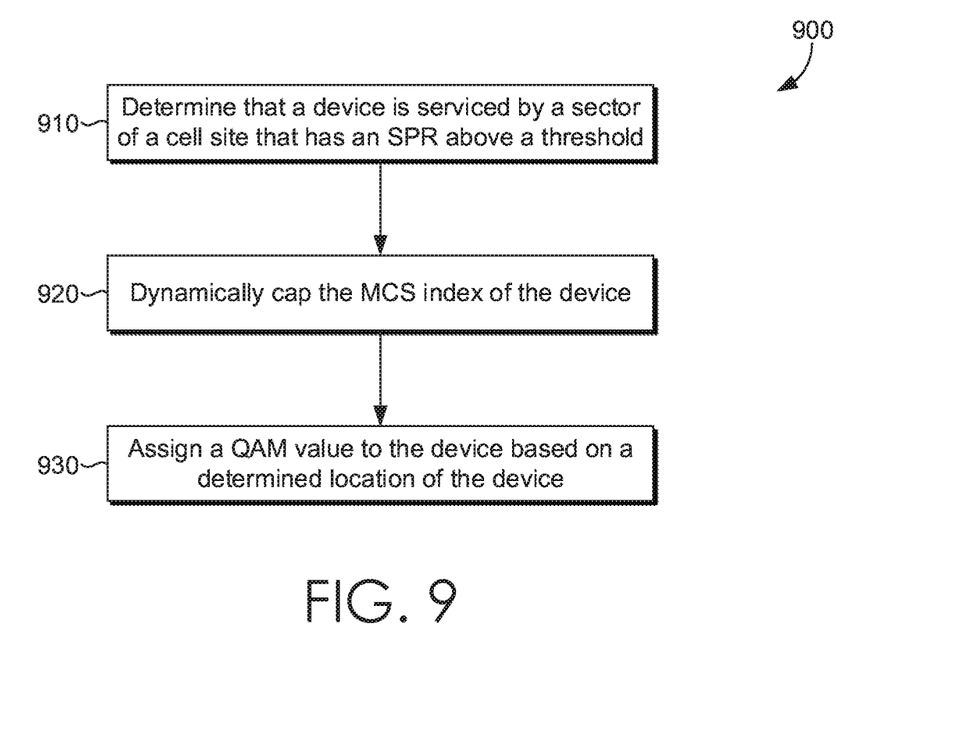
FIG. 9 depicts yet another exemplary flow diagram for dynamically capping an MCS index value.

Turning now to FIG. 9, exemplary flow diagram 900 comprises a method for dynamically capping an MCS index value. At 910, it is determined that a device is serviced by a sector of a cell site that has an SPR above a threshold. At 920, based on the SPR being above the threshold and without considering other channel conditions, the MCS index value of the device is dynamically capped. At 930, in response to the capping, a QAM value is assigned to the device based on a determined location of the device. Further, prior to assigning the QAM value, it may be determined that the location of the device is serviceable by two or more sectors that each have an SPR above the threshold. Prior to assigning the QAM value, the device may be serviced by one of the two or more sectors with a lowest SPR compared to the SPR of the two or more sectors. Accordingly, the QAM value may be assigned to the device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamically capping a Modulation and Coding Scheme (MCS) index value, the system comprising:
   one or more nodes, each of the one or more nodes configured to wirelessly communicate with one or more user devices in a geographic service area; and
   one or more processors configured to perform operations comprising:
   determine that the one or more user devices are serviced by a sector of a cell site that has a Sector Power Ratio (SPR) above a threshold, the SPR being associated with radio frequency power radiating outside of the sector of the cell site relative to the radio frequency power radiating within the sector;
   based on the SPR being above the threshold, dynamically cap the MCS index value of the one or more user devices; and
   in response to the cap of the MCS index value, assign a first Quadrature Amplitude Modulation (QAM) value to at least one of the one or more user devices based on a triangulation area corresponding to a location of the at least one of the one or more user devices.

2. The system of claim 1, further comprising:
   determine the threshold by analyzing a power supplied to a transmitting-receiving component of the cell site and a type of network signal emitted by the transmitting-receiving component.

3. The system of claim 1, further comprising:
   assign a second QAM value to at least one of the one or more user devices, wherein the second QAM value is greater than the first QAM value.

4. The system of claim 1, wherein the triangulation area is determined using an overlapping sector comprising three sectors, each of the three sectors corresponding to one of three antenna arrays.

5. The system of claim 4, wherein the location of the at least one of the one or more user devices is determined based on signal strengths of at least one signal from each of the three antenna arrays that the at least one of the one or more user devices received.

6. The system of claim 4, wherein the location of the at least one of the one or more user devices is determined based on a round-trip signal time of at least one signal from each of the three antenna arrays to the at least one of the one or more user devices.

7. The system of claim 1, further comprising:
   adjust the cap of the MCS index value when the SPR changes and when the changed SPR is above the threshold; and
   reassign the first QAM value based at least in part on the changed SPR.

8. One or more non-transitory computer-readable media having computer-executable instructions embodied thereon that, when executed, perform a method for dynamically capping a Modulation and Coding Scheme (MCS) index value, the method comprising:
   determining that a user device is serviced by a sector of a cell site that has a Sector Power Ratio (SPR) above a threshold, the SPR being associated with radio frequency power radiating outside of the sector of the cell site relative to the radio frequency power radiating within the sector;
   based on the SPR being above the threshold, dynamically capping the MCS index value of the user device;
   determining a location of the user device based on at least one cell site factor; and
   in response to the capping, assigning the MCS index value to the user device based on the location of the user device.

9. The media of claim 8, wherein the at least one cell site factor comprises (1) a first distance between the cell site and a second cell site within a predetermined range of the user device, (2) a second distance between the cell site and the user device, and (3) a third distance between the second cell site and the user device.

10. The media of claim 9, wherein the first distance between the cell site and the second cell site comprises a distance between a first antenna element of the cell site and a second antenna element of the second cell site.

11. The media of claim 9, wherein the second distance between the cell site and the user device is determined using a measured signal strength of a signal received by the user device from the cell site.

12. The media of claim 9, wherein the first distance, the second distance, and the third distance are determined using a precision factor and an accuracy factor, the precision factor and the accuracy factor accounting for error from positions and directions of the cell site, the second cell site, and the user device.

13. The media of claim 9, wherein the second distance between the cell site and the user device is determined using a measured signal strength of a signal received by the cell site from the user device.

14. The media of claim 8, wherein the at least one cell site factor comprises a distance from the cell site to the user device and a direction angle from an antenna element of the cell site to the user device.

15. The media of claim 14, wherein the direction angle is determined using a wireless access node of the cell site and GPS information of the user device.

16. The media of claim 8, wherein the at least one cell site factor comprises an elevation angle of the user device corresponding to the cell site.

17. The media of claim 8, wherein the MCS index value assigned to the user device comprises a Quadrature Amplitude Modulation (QAM) level, a Quadrature Phase Shift Keying (QPSK), or a Millimeter Wave (mmW).

18. The media of claim 8, wherein the at least one cell site factor comprises access information the user device has to at least one signal from an antenna of the cell site, the access information comprising frequency availability of a frequency band.

* * * * *